(12) United States Patent
Turner

(10) Patent No.: US 11,834,180 B2
(45) Date of Patent: Dec. 5, 2023

(54) PRECISION AUTOMATED AIR-TO-GROUND DELIVERY SYSTEM AND RELATED METHODS

(71) Applicant: Christopher Kyle Turner, Clovis, CA (US)

(72) Inventor: Christopher Kyle Turner, Clovis, CA (US)

( * ) Notice: Subject to any disclaimer, the term of this patent is extended or adjusted under 35 U.S.C. 154(b) by 681 days.

(21) Appl. No.: 16/735,703

(22) Filed: Jan. 7, 2020

(65) Prior Publication Data

US 2020/0231302 A1 Jul. 23, 2020

Related U.S. Application Data

(60) Provisional application No. 62/794,595, filed on Jan. 19, 2019.

(51) Int. Cl.
| | | |
|---|---|---|
| *G06Q 10/0832* | (2023.01) | |
| *B64D 1/12* | (2006.01) | |
| *B64C 39/02* | (2023.01) | |
| *B64D 1/14* | (2006.01) | |
| *B64U 101/60* | (2023.01) | |

(52) U.S. Cl.
CPC .............. *B64D 1/12* (2013.01); *B64C 39/024* (2013.01); *B64D 1/14* (2013.01); *G06Q 10/0832* (2013.01); *B64U 2101/60* (2023.01)

(58) Field of Classification Search
CPC .......... B64D 1/12; B64D 1/14; B64C 39/024; B64C 2201/128; B64C 2201/182; G06Q 10/0832; B64F 1/025
USPC ....................................................... 244/137.1
See application file for complete search history.

(56) References Cited

U.S. PATENT DOCUMENTS

| | | | |
|---|---|---|---|
| 6,019,317 A | | 2/2000 | Simmons et al. |
| 9,567,081 B1 * | | 2/2017 | Beckman ................. B64D 1/10 |
| 9,959,773 B2 | | 5/2018 | Raptopoulos et al. |
| 10,124,912 B2 | | 11/2018 | Walsh et al. |
| 2009/0026319 A1 | | 1/2009 | Strong |
| 2015/0370251 A1 | | 12/2015 | Siegel et al. |
| 2016/0033966 A1 | | 2/2016 | Farris et al. |
| 2016/0107750 A1 | | 4/2016 | Yates |
| 2016/0257423 A1 | | 9/2016 | Martin |

(Continued)

FOREIGN PATENT DOCUMENTS

| | | | |
|---|---|---|---|
| WO | WO-2004074091 A2 * | 9/2004 | ............... B64B 1/06 |
| WO | 2017034278 | 3/2017 | |
| WO | 2018213512 | 11/2018 | |

OTHER PUBLICATIONS

Walmart Files Patent for Drone Deliveries article retrieved on Oct. 17, 2019 from "https://www.mediapost.com/publications/article/341763/walmart-files-patent-for-drone-deliveries.html".

(Continued)

*Primary Examiner* — Russell S Glass
(74) *Attorney, Agent, or Firm* — Sierra IP Law, PC; William K. Nelson

(57) ABSTRACT

The present invention provides a unique system to deliver packages from aerial vehicles to the ground through the use of a sophisticated guidance system and impact-absorbing catching mechanism. The new systems and methods of the present invention provide package delivery from manned and unmanned aircraft that is fully automated and reliably accurate to deliver a package to a ground station operable to receive the package in the catching mechanism.

12 Claims, 12 Drawing Sheets

(56) References Cited

U.S. PATENT DOCUMENTS

| | | | |
|---|---|---|---|
| 2017/0090484 A1 | 3/2017 | Obaidi | |
| 2018/0105289 A1 | 4/2018 | Walsh et al. | |
| 2018/0350243 A1* | 12/2018 | Priest | H04W 4/02 |
| 2019/0300157 A1 | 10/2019 | O'Brien et al. | |
| 2019/0300202 A1 | 10/2019 | High et al. | |
| 2019/0300203 A1 | 10/2019 | High et al. | |
| 2019/0318296 A1* | 10/2019 | Ifill | G08C 17/02 |
| 2020/0198801 A1* | 6/2020 | Carthew | B64F 1/00 |

OTHER PUBLICATIONS

Pair Print Parent Continuity Data retreived on Oct. 3, 2019 from "https://ppair-my.uspto.gov/pair/PAIRPrintServlet".
English Abstract of WO2017034278 retrieved on Feb. 6, 2019 from: "https://worldwide.espacenet.com/patent/search/family/058100302/publication/WO2017034278A1?q=pn%3DWO2017034278A1".

* cited by examiner

PRECISION AUTOMATED AIR-TO-GROUND DELIVERY SYSTEM AND RELATED METHODS

This application claims priority to U.S. Provisional Patent Application No. 62/794,595, filed on Jan. 19, 2019, which is incorporated herein in its entirety by this reference.

FIELD OF INVENTION

The present disclosure relates to systems and methods of delivery of goods using manned and unmanned aerial vehicles. In particular, the disclosure provides an adaptable delivery method for incorporation into existing logistical models for delivery of supplies or products from the air.

BACKGROUND

Current operational topology models for major logistic companies and other large-scale business areas use the spoke and wheel distribution model. The spoke and wheel model is described as a center distribution hub, with connecting lines radiating out in all directions to different end points. This model's wide scale usage is largely due to the reality of transportation economics. It is more economical to build a single distribution center with a high front-end cost, and then supply a region from that single point. This operational model is far cheaper than using many smaller centers, or point to point, in a decentralized logistical model.

Regardless of the distribution model used, a substantial problem exists for real world logistics, known as the "last mile" problem. It is defined as the last stretch of distance from a product's origin, often a distribution center, to its final destination. The last mile problem alone represents over 53% of all shipping costs in the spoke and wheel model. The distance between origin and destination can be as short as a few blocks in an urban area, or can stretch out to hundreds of miles in rural parts of the world, but both scenarios represent serious physical and financial challenges.

The current, most economically viable, delivery method includes humans driving various vehicles, often large vans and trucks. This delivery method accounts for 7% of total traffic, but a disproportionally heavy 17% of congestion costs. Annually this delivery method costs around $28 billion dollars for gas, vehicle maintenance, and wasted man hours sitting in traffic. Dense population centers experience the majority of traffic congestion, however long-distance rural deliveries for a simple products such as a tooth brush and new slippers are not cost effective either.

Amazon, a market giant, reports that 86% of delivered packages weigh less than five pounds. While most packages are small and light, the volume of small parcels shipped from internet market websites has increased substantially. These electronic commerce sales reached $2.4 trillion dollars in 2018, driving most of the market for small parcel delivery. This market is currently valued at $83 billion dollars annually and its value is expected to double within ten years. However, shipping companies are already facing major logistical problems, such as a capacity crunch and driver shortages.

Non-commercial organizations are also challenged by the last mile problem. Search and Rescue (S/R), Fire Fighters (FF), and the Department of Defense (DoD) experience these logistical limitations, but with potential deadly ramifications when deployed ground parties are under supplied. Fundamentally, these issues arise from the operating environments for each of these organizations. These deployed ground parties operate in remote locations, often with limited to non-existing infrastructure available for supply transport.

Currently S/R, FF, and DoD organizations are required to plan ahead with "carried in" supplies, arrange full support ground resupply missions, or attempt an aerial resupply using current technologies. For S/R and FF, typical air to ground supply operations involves a manned helicopter to hover above ground units and lower material down using ropes and wenches. The DoD, utilize similar helicopter supply methods and often use fixed wing aircraft resupplies operations using parachutes, which are very inaccurate. However, each of these methods can pose their own serious complications. It is costly and potentially risky to anyone involved and the aircraft for these vital logistic missions. S/R and FF aircraft have to overcome communication problems, aircraft limitations, and environmental conditions such as inclement weather, while performing the hazardous operation. This also requires dedication of a helicopter for the resupply mission, removing it from other vital operations. DoD aircraft have the added difficulties of hostile forces engaging aircraft during resupply missions, and/or inaccurate and often damaged parachute delivery of supplies.

With the rising costs of the last mile problem, an economic and cultural force is pushing for increasing automation across multiple industries. Companies and National Defense Research Organizations are looking for solutions for these critical problems through the use of unmanned aerial vehicles (UAVs). Some UAV technologies have existed for decades, but use for specific automated package delivery has only been attempted recently to solve the problem.

At the moment, the best prototypes and early implementations of UAVs as a solution in the logistics field utilize inefficient multi-rotor drones to make deliveries to active recipients at limited ranges and very limited payload weights of less than five pounds. The UAV package drop off methods, require the vehicle to land on a reflective pad placed by an untrained recipient, or hover while lowering a package from a rope. These methods are extremely inefficient and place the UAV and the package in an exposed position. As the technology pushes for less human interaction for the recipient, package and delivery drone theft will increase, significantly driving costs up.

SUMMARY OF THE INVENTION

The present invention provides a package delivery and capture system to address the shortcomings of conventional package delivery systems. The present invention addresses the last mile problem for the logistics field, using an autonomous package delivery system that can accurately deliver packages without the need for a drone or other UAV vehicle to stop and hover over a target area. The system and methods described herein will the costs and delays that define the overall last mile problem, and package delivery will become much cheaper and more efficient thereby facilitating continued growth in e-commerce.

The system is designed to enable aircraft to maintain flight, or hover, at safe altitudes over the destination to safely deliver a package to the ground. A device at the destination called a "ground station", communicates with the aircraft and coordinates the aerial package delivery process. Using ground station and aircraft environmental data (e.g., wind), the system calculates a projectile trajectory for the package to land directly on the ground station. Once the aircraft is in a suitable position to release the package based on the calculated trajectory, the package is released from the aircraft and allowed to fall towards earth along the trajectory. Wind interference and small calculation errors are corrected on the package in flight, by control surfaces and a guidance system. This guidance system will track and seek a signal generated from the ground station. This signal will guide the package into the ground station's fall arresting mechanism, which safely absorbs the kinetic energy of the falling package. After the package has been brought to a safe stop, the package can be retrieved by the recipient and the system will reset for another package delivery.

Utilizing electronic instruments and devices, the system is able to stay inexpensive yet accurate and reliable. High accuracy may be achieved using multiple instruments, including, but not limited to, a homing beacon emitted from the ground station that the package is designed to track, a sensor and control circuit in the falling package for capturing and interpreting the signal from the homing beacon, and ailerons on the package, the position of which may be controlled by the control circuit within the package to adjust the trajectory of the fall directly into the catching mechanism of the ground station.

The ground station may include shock absorbers built into the catching mechanism dissipate the kinetic energy. Using multiple impact absorbing mechanisms, the ground station may safely bring the package to a stop over a controlled distance. The ground station may further include a package handling assembly and process that conveys the package to a safe location for retrieval by the recipient.

DETAILED DESCRIPTION

The inventor provides a unique system to deliver packages from aerial vehicles to the ground through the use of a sophisticated guidance system and impact absorbing catching mechanism. The new system provides package delivery from manned and unmanned aircraft that is fully automated. The present invention is described in enabling detail in the following examples, which may represent more than one embodiment of the present invention.

Delivery System

Figure 1:
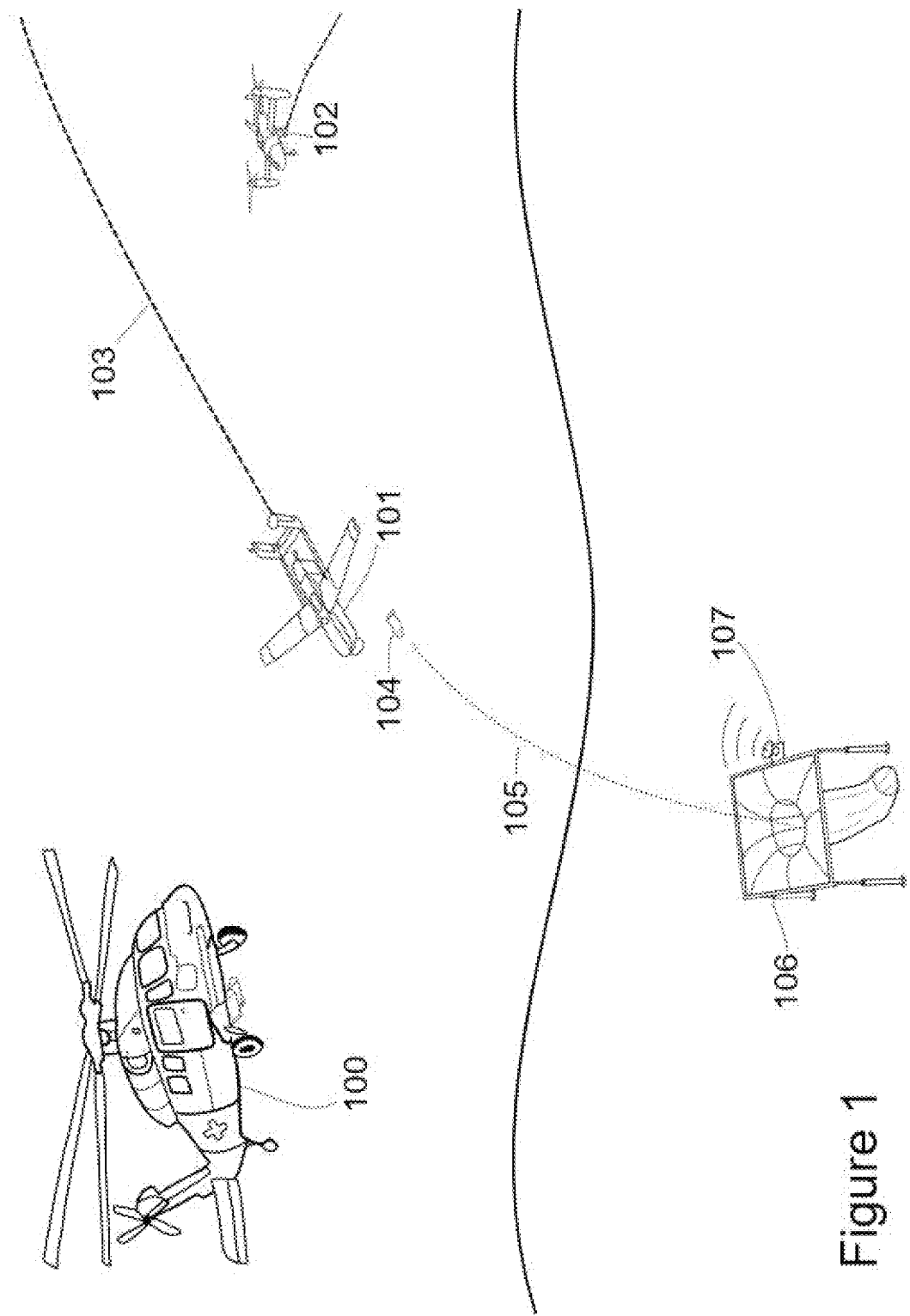
FIG. 1 shows a system operation overview of a delivery using various aircraft with a ground station of an embodiment.

FIG. 1 shows a system operation overview of a delivery using various aircraft with a ground station 106 of an embodiment. The unmanned fixed wing aircraft 101 is maintaining a safe flight path 103 while performing the delivery drop operation. Unmanned fixed wing 101 and unmanned rotary aircraft 102 as well as manned fixed wing and manned rotary aircraft 100 are all capable of utilizing the system. This capability is from the design of the system, where the aircraft can release the package at an altitude exceeding typical ground obstructions. In some embodiments the aircraft can safely release the package from an altitude of 400 ft or less.

The path of the droppable package 104 is identified as the fall trajectory 105. Using modern physics' predictive trajectory algorithms, it is possible to accurately predict the landing location of a free-falling object. In certain embodiments, the ground station 106 uses a Line of Sight (LOS) Radios 107, to transmit location and environmental information to the aircraft. However, any suitable wireless communication, such as infrared or visual light communication, may be used.

This system is aimed to streamline the delivery of the last mile in current and future logistical models. Automating a receiving fall arrest device and catching a package from the air, minimizes aircraft flight duration and eliminates the need to land at, or hover over, the destination. This system is able to utilize any flight route designation technology to get the aircraft from its supply center to airspace above the ground station 106. In some embodiments, the flight route designation technology utilizes the global positioning system (GPS). For these reasons all modern aircraft types are able to be used in this technology.

Unmanned fixed wing aircraft 101 are the ideal vehicle for most commercial delivery applications using this technology. Fixed wing aircraft use airfoils for lift and are capable to transport heavier loads over longer distances compared to rotary aircraft of similar size and power. These flight characteristics create the most adaptable vehicle for delivery in rural and most urban environments with no risk to pilots. Using autonomous flight technologies, the aircraft is also available any time of day. In some embodiments, autonomous flight technologies may comprise a controller utilizing multiple control-loop layers to form a hierarchical control system capable of planning flight path and trajectory regulation and generation. Using sufficiently high flight paths 103, only dense city centers with high rise buildings create a collision hazard that needs to be addressed using additional technologies.

Unmanned rotary aircraft 102 are the ideal vehicle for the densely populated urban areas. The primary lift for these aircraft is a motor and propeller directly fighting the pull of gravity. This propulsion setup allows for hovering and vertical takeoff and landing capabilities (VTOL). In the late 1990's, a four-motor variant was developed that proved stable and agile. Extensive developments for these aircraft in the 2000's have made them the most common commercially available unmanned aircraft flying today. Their configuration allows for quick and agile flight, with hover capabilities, but at the cost of limited range and weight capacity. The aircraft's maneuverability and limited range makes it the best platform for dense city package delivery.

Manned rotary aircraft 100 were developed following WW2. These aircraft, often called helicopters are most often characterized by a large rotating propeller over the main body of the aircraft with a secondary stabilizing propeller. They offer VTOL capabilities, but are a slower platform with limited ranges when compared directly to fixed wing aircraft. However, they are ideal for operations at lower altitudes and often are found in close support operations of ground units. This integration into ground units makes them ideal for the system while concurrently performing their specific roles. The aircraft would have mission specific droppable packages mounted on an exterior surface such that no collision after separation is likely during normal flight maneuvers. The system would interface with these aircraft so supplies could be delivered automatically by helicopters already operating in the airspace.

Manned fixed wing aircraft are the heaviest payload carriers and fastest aircraft when compared directly to other platforms. Currently their only means of getting supplies to the ground requires the aircraft to land or use of parachutes. Often landings are not possible, due to limited available space, and parachute deliveries are only suitable for larger resupplies operations, due to their inaccuracy. Ground personnel have to clear a very large landing zone that the parachute supplies can land in. Additionally, in the event that the parachute fails to deploy, the supplies can be damaged extensively. In the best case scenario, the supplies can still be used but are scattered over a large area requiring ground personnel to spend time in the drop zone to recover them. In the worst case, the supplies are too damaged to be used and thus supplies and travel time are wasted.

Using this system, fixed wing aircraft can fly a general path over the ground station 106, without the risk of inaccurate or damaged supplies. The pilot of the aircraft does not have to devote large amounts of concentration on the supply run. Once the system identifies that aircraft is in sufficient location, the droppable package will automatically detach. This will allow the aircraft to take emergency evasive maneuvers if the need arises. The system will automatically operate if the criteria are met eliminating bad drops of needed supplies on the ground. In certain embodiments the aircraft will carry a number of droppable packages that will be dropped on multiple supply runs or to multiple different ground stations. In certain embodiments the aircraft will carry a larger or multiple larger droppable packages 104 for more supplies into large ground stations 106. In certain embodiments the total payload weight of one or more packages on the aircraft may be up to 500 lbs. In some embodiments, the total payload may be limited to 50 lbs. or less where legal restraints exist on the total payload of an unmanned aircraft.

Drop Process

Figure 2:
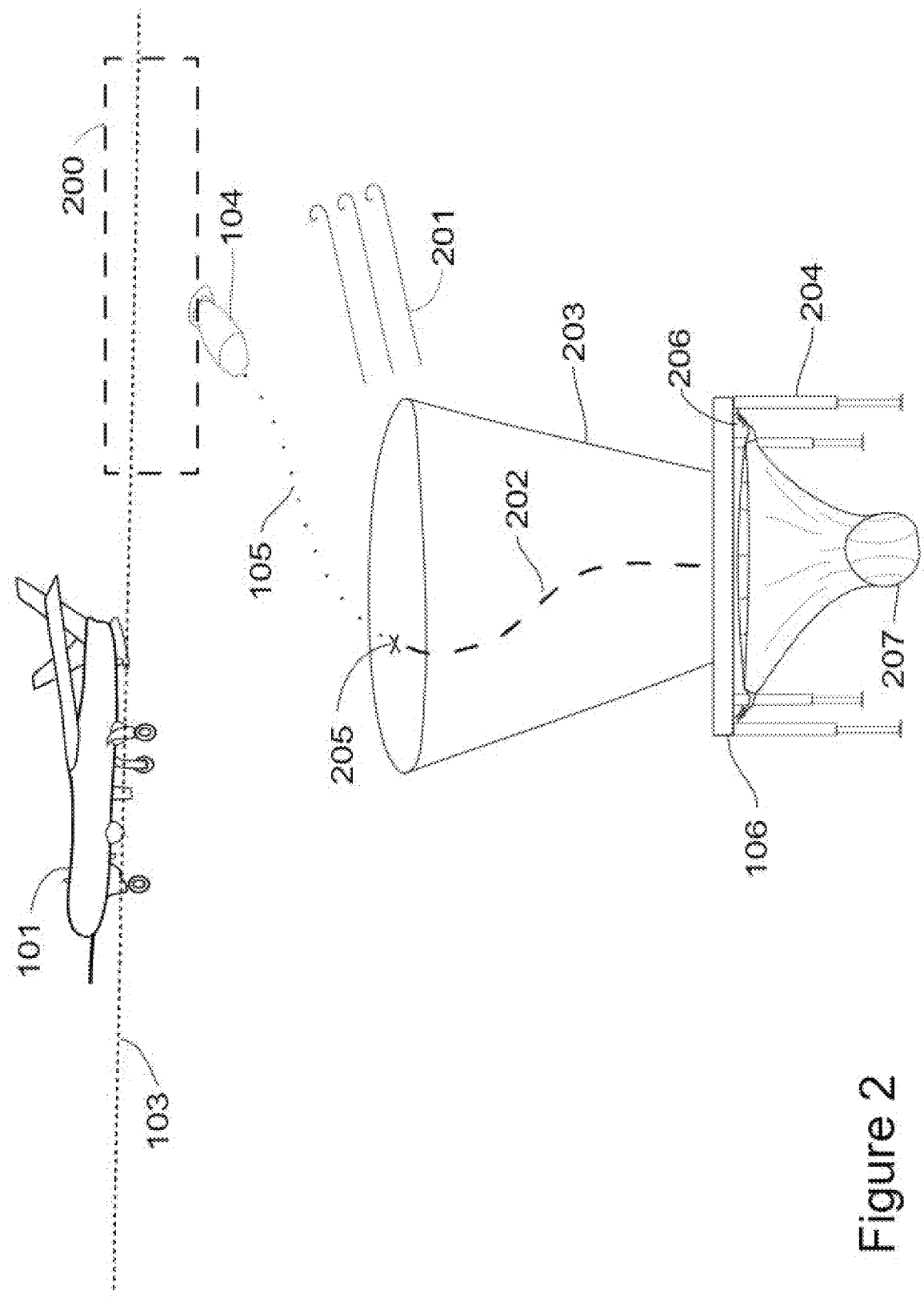
FIG. 2 depicts an embodiment of the drop system and guidance diagram in operation using a ground station.

FIG. 2 depicts a drop system and guidance diagram in operation using a ground station 106. The unmanned fixed wing aircraft 101 may maintain a safe flight path 103 high enough above most buildings and trees. The flight path 103 altitude may be the aircrafts original cruise altitude or may be reduced once the aircraft is over the ground station based on system configuration. An authorized aircraft on a supply run may include an onboard computer operable to enter a calculated ideal drop window 200 along the safe flight path 103, and the system will automatically release the droppable package 104 with authorization from the ground station. In some embodiments, the altitude of flight path 103 and ideal drop window 200 may range from about 50 feet up to about 10,000 feet. In some embodiments, the altitude of the flight path may be limited to 400 feet or less where legal restraints exist on the maximum altitude for unmanned aircraft flight. The fall trajectory 105 is calculated to place the droppable package 104 into the ground station 106 without requiring correction. Environmental factors 201 (e.g., wind or errors from sensor interference) may cause the droppable package to drift off the calculated trajectory. Trajectory drift may be corrected by the ground station emitting a homing beacon 203 in an upward conical pattern. Once the package enters the beacon cone 203 at the entry point 205, it will track the beacon signal and begin altering course using aerodynamic control surfaces to achieve the corrected fall path 202.

The ground station 106 may be constructed in such a way to absorb the impact forces of the droppable package 104. In the preferred embodiment, a semi-rigid, durable material may be connected to initial shock mechanisms 206 comprising elastic and compressible devices such as springs, hydraulic or pneumatic pistons, or other shock absorbing structures. These mechanisms will absorb kinetic energy from the droppable package 104 and to thereby prevent a bounced ejection of the package 104. In certain embodiments, secondary shock absorbing mechanisms 204 comprising of stronger elastic and compressible devices may be used to prevent more massive packages from overwhelming the absorbing mechanism 204. In certain embodiments, the droppable package 104 may be passed through a transfer chute 207 after the catch, using gravity or other mechanisms guiding the package to a holding location. In certain embodiments, the droppable package 104 may be safely moved onto the ground by mechanical means after the catch has been completed. In certain embodiments, the droppable package 104 will remain in the ground station, activating a sensor to hold additional package drops until the recipient removes the package from the catching mechanism.

Figure 3:
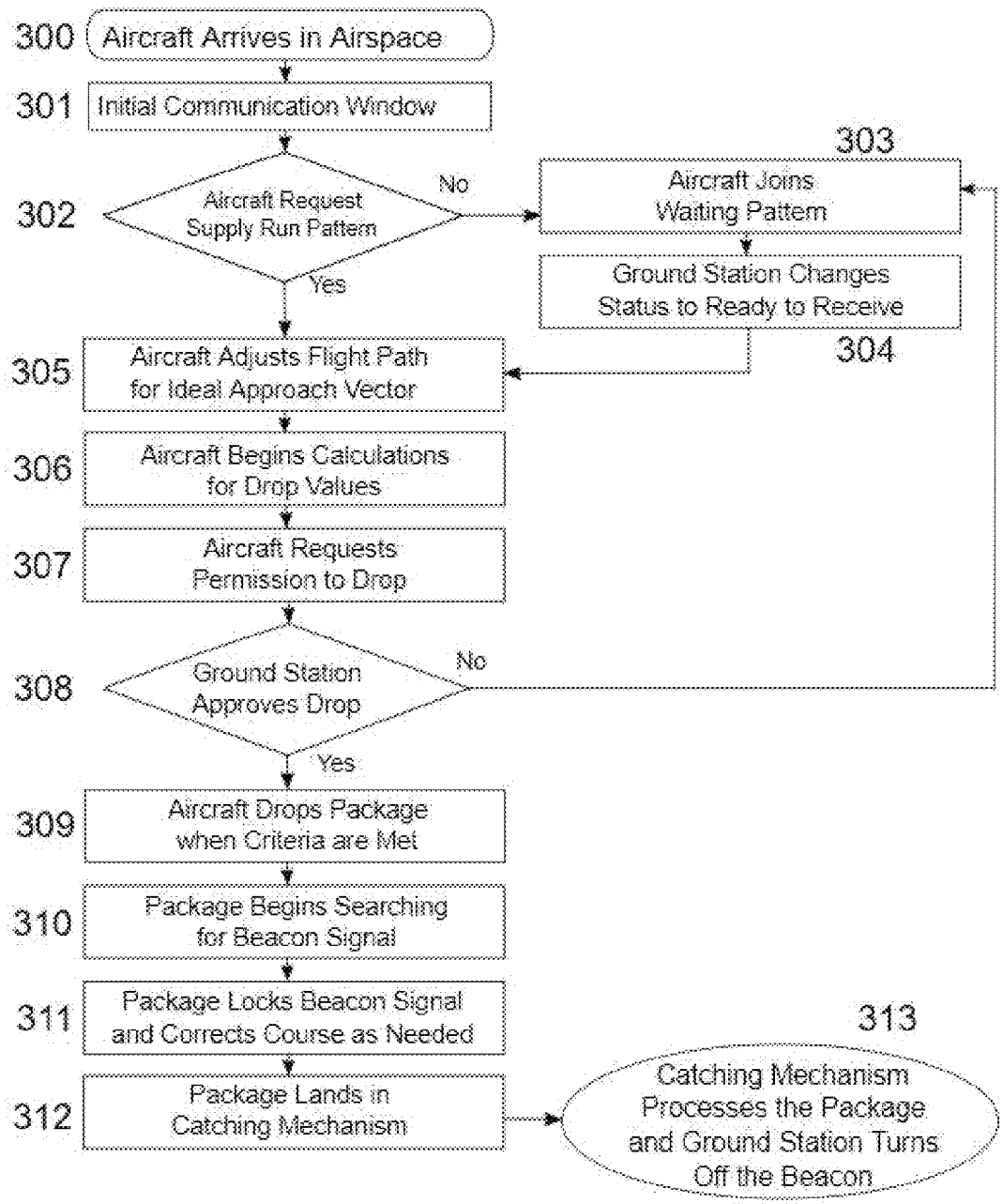
FIG. 3 illustrates a flow diagram of an embodiment for the delivery system process once the aircraft is on station.

FIG. 3 illustrates a process flow diagram of an embodiment for the delivery system between the aircraft and the ground station. This process is independent of the flight route designating technology that the aircraft takes from the supply center to the destination. The process begins when the aircraft arrives in the airspace 300 above the ground station. In certain embodiments, after the aircraft arrives, it will establish a communication window 301 with the ground station. Data comprising of GPS positions, ideal aircraft approach vector, and other package drop coordination information, related to trajectory calculations, may be exchanged.

After the initial communication window has ended for the package drop coordination information, data error checking, and corrections performed, the aircraft may request the ground station to enter the supply run flight pattern 302. If the ground station has other aircraft with priority for use of the pattern, it will direct the current aircraft to follow a pre-determined and programmed waiting pattern 303. Once in the waiting pattern, the ground station will recall the aircraft in priority order from the waiting pattern when ready for the supply run 304. In some embodiments, manned aircraft will have priority over unmanned aircraft. In some embodiments, ground station operators may be able to set priority to the supply run 304 use based on supply needs at the ground station.

Once given clearance to enter the supply pattern, the aircraft will adjust course to achieve the ideal approach vector 305, received by the ground station in the initial communication window 301. While the aircraft is adjusting course to align with the ideal approach vector, the flight controller will begin using the ground station's location and environmental factor data, which were communicated by the ground station to the aircraft in the initial communication window, to calculate an ideal drop point 306 for a successful uncorrected fall trajectory into the ground station. In certain embodiments, acceptable error limits would be included in calculations to produce a minimum drop value based on the ideal drop value for the droppable package, creating an acceptable drop window. After the ideal and minimum drop values are calculated, the flight controller determines if the current flight path will take the aircraft through the drop window based on the calculated minimum drop value. If the flight path is not suitable, the flight controller will attempt to correct the flight path to attain a suitable drop window. If the flight controller accepts that the predicted current flight path of the aircraft will result in a successful drop, it will request final drop approval from ground station 307.

If the ground station has received a new higher priority request, detects unpredictable strong environmental factors, or determines some other reason to deny the drop, the ground station will not approve the final drop request 308. If the ground station denies the aircraft request, the aircraft may be placed back in the waiting pattern 303.

If the ground station authorizes the drop 308, it will activate the homing beacon, which may be located at or near the catching mechanism. Once the aircraft enters the drop window, it will release the droppable package automatically after the minimum drop value is met 309.

When the droppable package is released from the aircraft, it will activate a homing beacon sensor. This sensor will begin searching for the ground station's homing beacon 310. In some embodiments, the aircraft may release the package directly into the homing signal cone. In other embodiments, the package may fall through the air for a short duration prior to entry into the homing signal cone. Once in the homing cone, the droppable package homing sensor will lock onto the ground station's beacon signal and the droppable package will begin performing fall trajectory corrections 311. These trajectory corrections will be performed using flight surfaces (e.g., ailerons) to guide the droppable package into the ground station's catching mechanism. In some embodiments, the droppable package may have safety devices (e.g., emergency parachute) installed in the event that the homing signal is lost.

When the package arrives at the catching mechanism, the energy absorption mechanisms will dissipate the kinetic energy of the droppable package and inform the ground station of the successful catch. After the successful catch signal is received, the ground station will process the package and turn off the homing beacon signal 313. In some embodiments, the ground station will have a time out system (e.g., watchdog timer), to alert personnel if a failed catch has occurred.

Electronic System

Figure 4:
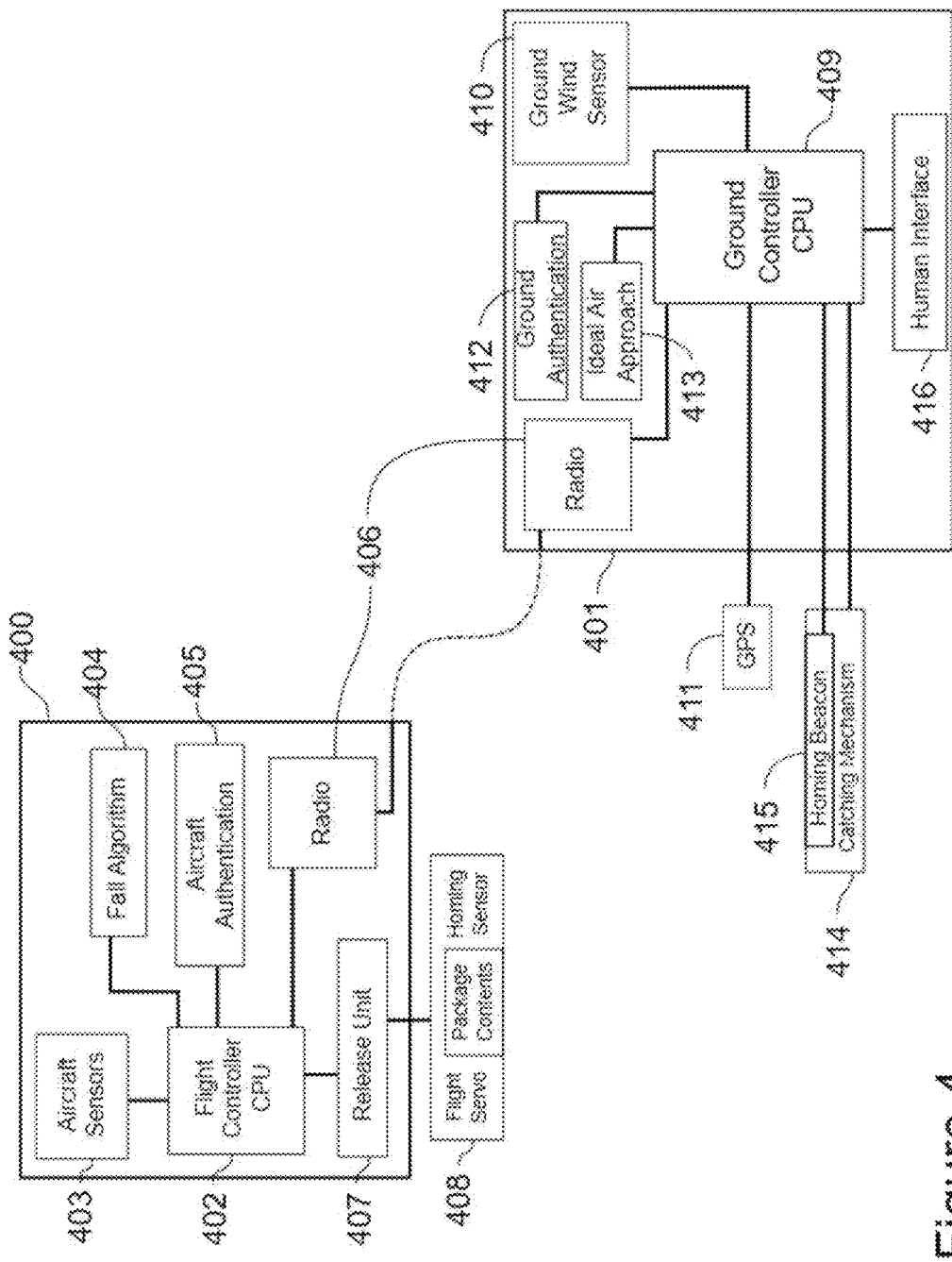
FIG. 4 illustrates a block diagram of an electronic system, its components, and subcomponents for the aircraft and ground station according to an embodiment of the present invention.

FIG. 4 illustrates an embodiment of a block diagram for the electronic system, comprising of components and subcomponents that are in electronic communication and allow for communication and coordination between the aircraft and ground station. The electronic system diagram includes aircraft electronics 400 and ground station electronics 401. The aircraft electronics 400 are located on the aircraft with other airframe electronics or mounted in a separate attached module and the ground station electronics 401 are in the ground station. In certain embodiments, the ground station electronics 401 are housed in the frame of the catching mechanism or in a separate housing connected by a durable cable. In certain embodiments, the unmanned aircraft flight controller central processing unit (CPU) 402 may run the overall system electronics, while other embodiments, the system may have a separate CPU from the aircraft flight controller. For other embodiments intended for manned aircraft, the separate CPU will make calculations and provide the pilot with course corrections to achieve an acceptable drop window. Regardless, the processor will interface with the aircraft sensors 403, such as global positioning system (GPS), compass, barometer, altimeter, and speed indicator.

The aircraft electronics 400 will communicate with the ground station electronics 401 using a radio link 406. This link may be a line-of-sight (LOS) radio and the primary method of communication between the flight controller CPU 402 and ground controller CPU 409. In certain embodiments, aircraft electronic subcomponents such as the fall algorithm 404 and aircraft authentication 405 will directly interface with the flight controller CPU 402. In certain embodiments, the fall algorithm will be a memory portion of the flight controller CPU 402 that holds the algorithm used for fall trajectory calculations. The CPU 402 will perform the calculations and retain the results to apply corrective actions on the flight path. In certain embodiments, the CPU 402 will make predictive calculations based on all data received from multiple sensors. The aircraft authentication 405 subcomponent in certain embodiments may be a memory portion on the flight controller CPU 402, used to store identification information for the aircraft and, in some examples, the droppable package 408. This information will be relayed to the ground station for priority selection or used to reject fraudulent supply run attempts.

A release unit 407 may be operable to activate a release mechanism (e.g., a mechanical mechanism such as quick release mounting clamps, or other releasable connection mechanism between the aircraft and the package 408) to uncouple from the package 408 to allow it to be released from the aircraft. The release unit 407 may be physically connected to the release mechanism in physical contact with the droppable package 408 and may be in electronic communication with the Flight Controller CPU 402 via wired or wireless connection. In certain embodiments, the release unit 407 will be electrically connected to the droppable package 408, for data exchange or charging of batteries in the droppable package 408 for running the electronics 408 therein, which may include a flight servo, homing sensor, and other communications electronics. When the flight controller CPU 402 sends a signal to the release unit, the release unit 407 will disconnect the quick release mounts or other mechanical mechanism and any electrical connections. Once the release mechanism disconnects from the droppable package 408, the droppable package will initiate its path on the fall trajectory. Also, upon release, the homing sensor therein will activate and begin searching for the ground station homing beacon signal 415. In certain embodiments, the homing senor will operate on RF or IR direction finding principles. Fall trajectory corrections from the beacon sensor will be sent to the flight servos which will control ailerons in the tail section discussed later in the detailed description.

In some embodiments, the ground station electronics 401 will communicate with the aircraft electronics 400 using the radio link 406. In some embodiments, the ideal air approach 413 and ground authentication 412 may be subcomponents of ground station electronics that interface with the ground controller CPU 409. In other embodiments, the ideal air approach 413 information may be a memory module in the ground controller CPU 409. Such memory module may be programmed by a qualified operator to achieve a fall trajectory that is clear of any obstructions, such as buildings or trees. During the initial communication window with the aircraft, information such as the course direction, altitude, and speed will be sent to the aircraft to facilitate its ideal approach to the supply run pattern. In some embodiments, the ground authentication 412 subcomponent may be a memory module in the ground controller CPU 409, used to store identification information about the ground station. This information may be relayed to the aircraft during initial communication window to verify that the ground station is the correct destination.

The ground wind sensor 410 may measure and indicate wind direction and speed to the ground controller CPU 409. In certain embodiments this data will be sent in real time to the flight controller CPU 402 over the radio link 406 for fall trajectory calculations. In certain embodiments, the ground wind sensor 410 in conjunction with the ground controller CPU 409 will log a history of wind speed and direction to be used for predictive calculations of fluctuating wind conditions. This information can also be used to wave off aircraft in unsafe weather conditions. The wind history log will be kept to assist with accurate predictions. In some embodiments, this log file will be sent to the aircraft during the initial communication window to assist in predictive fall trajectory calculations.

The GPS 411 module will give current location data of the catching mechanism 414 to the Ground Controller CPU 409 to be transmitted to the aircraft for accurate fall trajectory calculations. The catching mechanism 414 is discussed in more physical detail below, however the component interfaces with the ground controller CPU 409 electrically. One electrical connection is the control of the homing beacon 415. When the ground controller CPU 409 accepts the aircrafts request to start a supply run pattern, the homing beacon 415 will be activated. In certain embodiments, this signal will be electromagnetic waves selected for ideal direction finding, wave propagation properties, and local law conformity. Another interface of the ground controller CPU 409 and the catching mechanism 414 are for impact sensors that detect if a droppable package 408 has impacted in the catching mechanism 414. If the ground controller CPU 409 does not receive a signal from the impact sensors (e.g., motion detection sensors, piezoelectric vibration and shock sensors, or other appropriate sensors) on the catching mechanism 414 indicating impact of the package within a pre-determined timeframe, alerts will be sent out by the ground controller CPU 409 to qualified operators.

In certain embodiments, the ground station electronics 401 may have an attached human interface module 416. In certain embodiments this will be a connection port, that qualified operators are able to electronically connect a graphical user interface or other electronic interface and program the ground station electronics 401. In some embodiments, the human interface module 416 will be in a separate housing from the frame of the catching mechanism, connected by a durable communications cable. In certain embodiments, the ground station electronics 401 will be housed within the frame or attached in a safe enclosure of the catching mechanism 414. In some embodiments, the ground station electronics 401 will be housed within the separate human interface module 416.

The ground station will have multiple embodiments for different operational applications. Certain embodiments will be designed to interface with portable radio systems capable of transmitting and receiving digital information. The interface may be a preset human interface 416 control panel to quickly request delivery of items needed in the field without the need for human-to-human communication (e.g., oral communications, typed narrative instructions, etc.). For some commercial application embodiments, the ground station would interface with network communications and mobile applications to provide a provisions ordering application. For example, the application may provide for expedited ordering of items from a pre-determined selectable itemized menu for such things as food, groceries, and products with automatically attached destination information.

In certain embodiments, the ground station electronics 401 may be connected to available power infrastructure. In developed regions, this will provide constant and stable power requirements for the ground station. Certain embodiments will use battery backup systems in the event of emergencies. Portable embodiments will utilize battery packs for electrical requirements. Ground station electronics 401 will be designed to reduce operational power consumption. In certain embodiments, solar panels will be utilized in conjunction with batteries to extend operational life. Additional battery packs will be capable of being delivered using the system, with low battery warnings for the qualified operators.

Droppable Package

Figure 5:
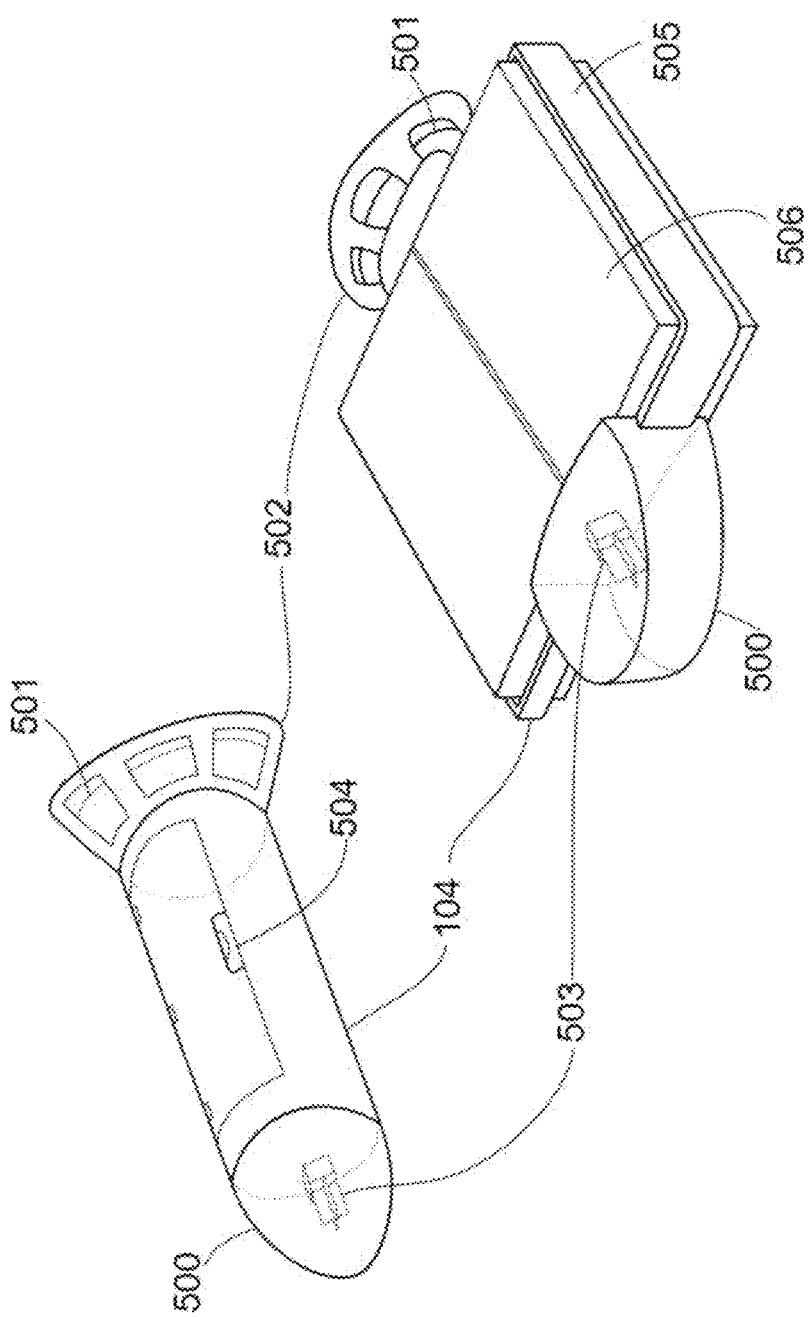
FIG. 5 depicts droppable packages highlighting key features and showing adaptable components.

FIG. 5 depicts droppable packages 104 highlighting key features and showing adaptable components. In preferred embodiments, droppable packages 104 may be outfitted with a nose cone 500 and tail section 502. In some embodiments, the droppable packages 104 will have a compartment or mounting space therein for deliverables in different configurations.

In certain embodiments the nose cone 500 would be fitted to the front end of the droppable package 104 to reduce aerodynamic drag and provide a cavity for the homing beacon sensor 503 to be mounted. The material would be constructed such that it allows the beacon signal to pass through without interference. In certain embodiments, the nose cone 500 will be constructed of heavy-duty plastic. In certain embodiments, the nose cone 500 will be made from translucent material for use of light emitting homing beacon signals. Exemplary materials for the nose cone include acrylic, polycarbonate, or other sturdy polymeric materials appropriate for nose cone construction.

Figure 5A:
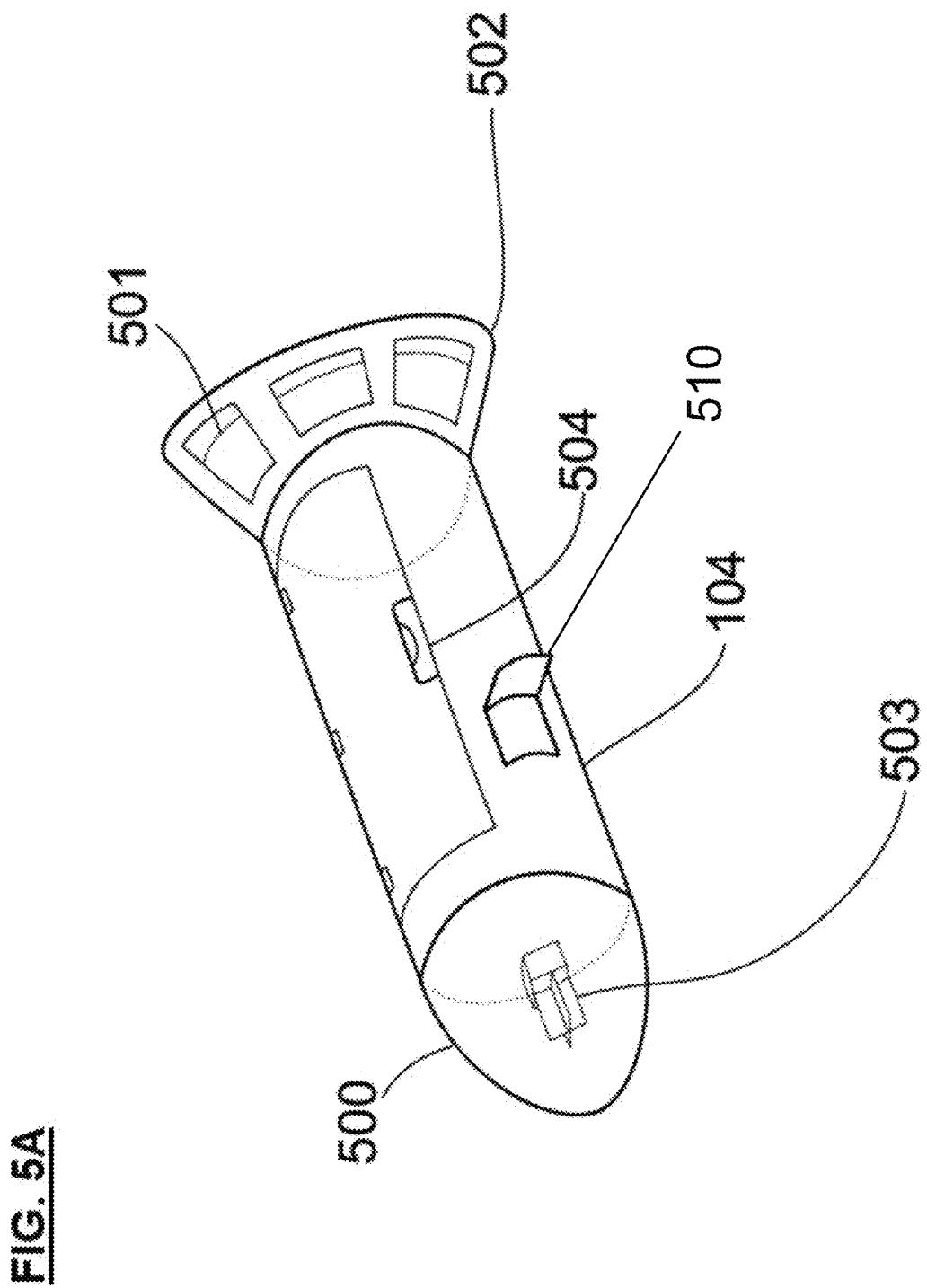
FIG. 5A depicts a droppable package according an embodiment of the present invention.

In certain embodiments the tail section 502 will be mounted such that to best apply corrective forces for the fall trajectory on the droppable package 104. In some embodiments, this placement of the tail section 502 would be in the aft portion of the droppable package 104. The corrective forces to achieve the correct trajectory will be performed by aerodynamic control surfaces 501. The control surfaces may be aileron flaps connected to an electromechanical control system. For example, the ailerons may be in mechanical connection with servos controlled by a circuit housed onboard the droppable package 104, which is in wireless electronic communication with the ground station electronics 401. For example, communication to the onboard circuit may be provided through signals from the homing beacon sensor 503. The circuit may receive directional guidance from the homing beacon sensor 503, and then apply electrical power to the correct servo based on the data in the received signal. These servos would change the pitch of the flap, altering airflow, and thus applying force to adjust the flight path of the droppable package 104. In some embodiments, the droppable packages 104 may also be equipped with glider, a chute, or some other gliding mechanism to facilitate a smooth decent. For example, a gliding mechanism may be deployed once the droppable package is a pre-determined distance from the ground to slow the decent of the droppable package when delivering to a location with a high number of obstacles or within a densely inhabited area, such as a neighborhood. In some embodiments, the large droppable packages 104 would have expandable air brakes to reduce terminal velocity. The expandable airbrakes would be additional flaps designed to create a uniform drag, reducing terminal velocity of the package. FIG. 5A provides a view an exemplary air brake system using deployable flaps 510 for creating air resistance and slowing the flight of the droppable package 104. The deployable flaps may be in mechanical communication with an electromechanical deployment mechanism controlled by the onboard circuit (e.g., a servo, electromechanical linear actuator, etc.).

Supplies carried by the droppable package 104 may be housed in an integrated hollow section with a secure lid 504. This cavity can be designed to use multitude of interior shock absorbing material. The scale of the droppable package can be increased or decreased per application. The limiting factor for size of the droppable package may be the dimensions of the opening for the catching mechanism. In some embodiments, the droppable package 104 may be a frame structure that includes frame 505 and is operable to accept and secure a box 506 for carrying a cargo. The other elements of the droppable package may be mounted on the frame 505 (e.g., the nose cone 500, tail section 502, etc.). In certain embodiments, package housing is standardized and rigid enough for mounting options. These options would allow nose cone 500 and tail section 502 modules to be directly attached to the package body. This type of embodiment would be well suited for supplies that are already in standardized shipping or packing containers. The frame may include securing mechanisms, such as a vice-like compression mechanism that can apply force to the package, an inflatable ring, a compressible material lining the interior of the frame 505, and other mechanisms for securing the box 506 in the frame 505.

In some embodiments, nose cone 500 and tail sections 502 modules will be completely reusable. These can be designed such that the entire droppable package 104 or separable modules can be removed and recycled for future droppable packages. For commercial applications the recovery method for used droppable packages 104 may be similar to trash collection services. Customers would remove their supplies and place the droppable package 104 into a storage bin from which the used droppable package 104 would be recovered.

In some embodiments, the droppable package 104 will be designed to be disposable in such a way that large amounts of the droppable package 104 structure will be environmentally friendly. Removing and reusing control modules will reduce costs and environmental waste. In some embodiments, the control modules of the droppable package 104 will be destroyed upon impact by design. This will prevent reusing of any part by unauthorized personnel.

Figure 5B:
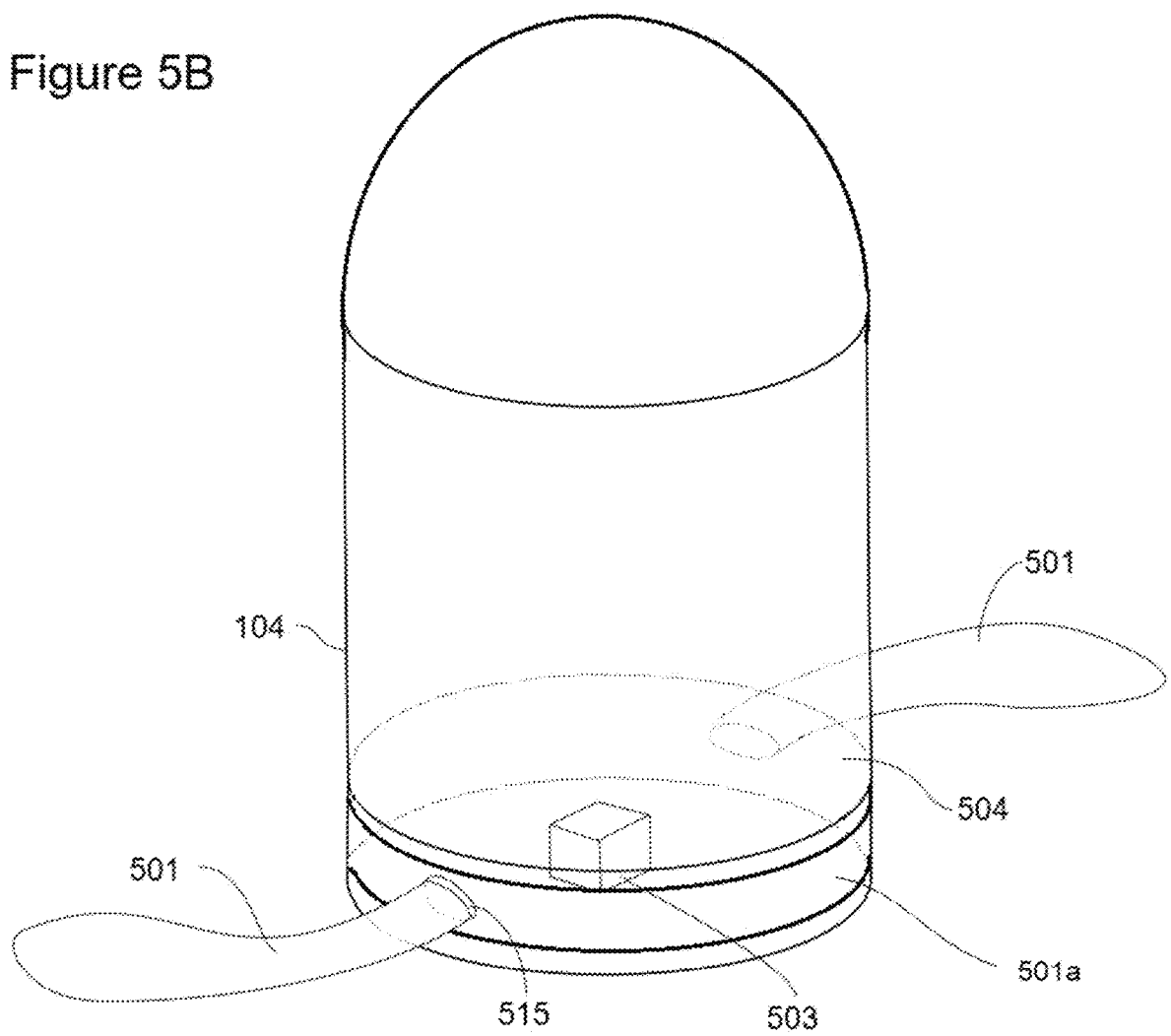
FIG. 5B depicts a droppable package according an embodiment of the present invention.

The droppable package of the present invention may include one or more devices for reducing the air speed of the droppable package to decrease the impact speed on the catching mechanism and to improve general safety of the system. For example, FIG. 5B depicts an embodiment of a droppable package 104 that utilizes the control surfaces 501, to assist speed reduction during descent. Operating in a similar manner to maple tree seeds, known as samaras, the droppable package 104 would use the control surfaces 501 to create rotational forces causing the package to spin and generating lift, greatly reducing terminal velocity. Guidance for the droppable package 104 would use the homing signal sensor 503 from ground controller CPU 409, to articulate the control surfaces 501 at the mount bracket 515 using mechanical servos. Package contents would be secured under the package lid 504 in such embodiments. In some examples, the control surfaces 501 may connected to a collar or ring 501a that is rotatably connected to the package 104, such that the control surfaces 501 can cause the collar to spin and generate lifting forces, while the package body experiences little or no spin. The collar may be positioned on the body of the package 104 with a aeronautical propeller bearings or other bearing structure operable to allow the collar 501a to spin around the body of the package 104.

Catching Mechanisms

Figure 6:
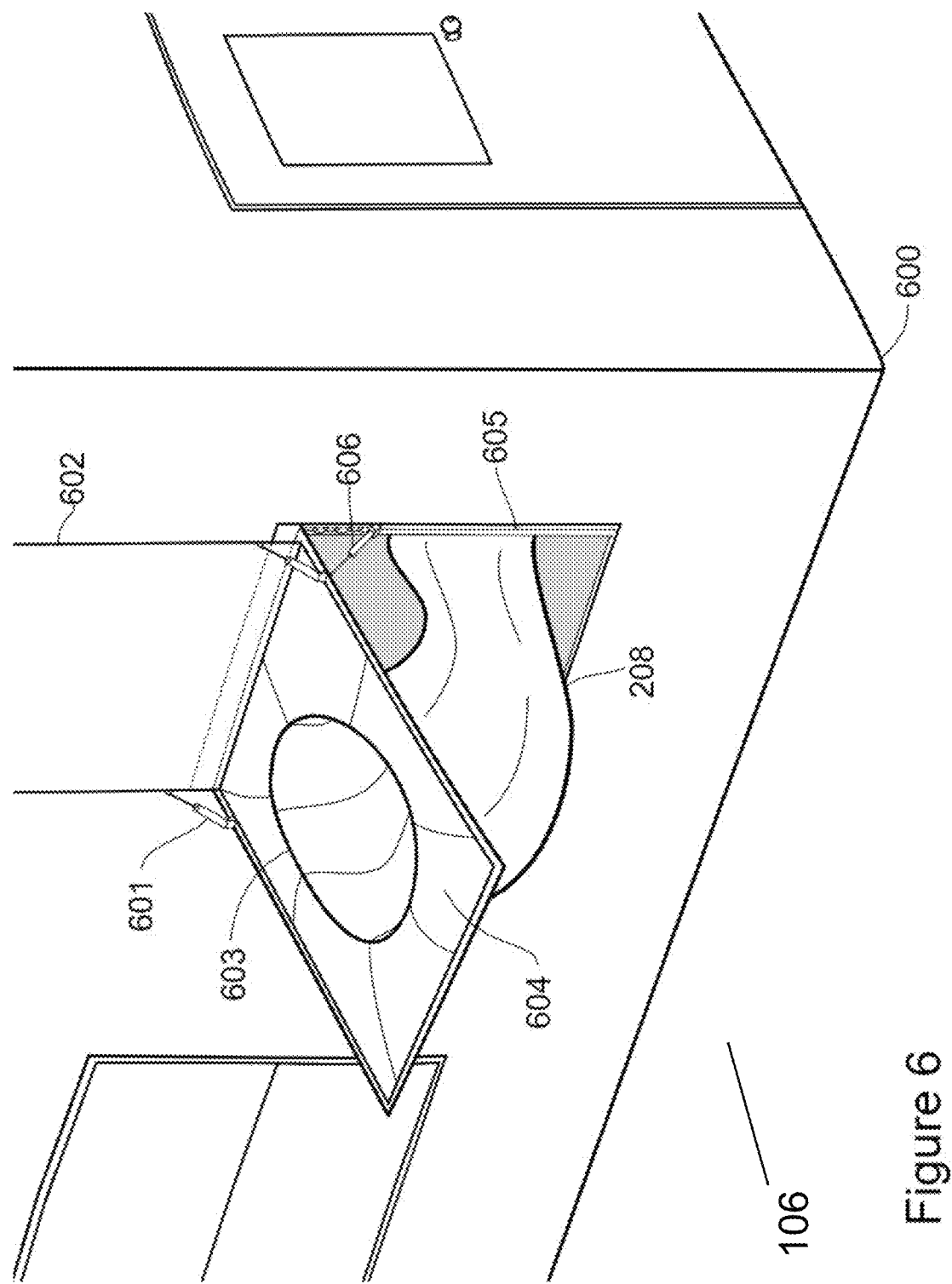
FIG. 6 shows a catching mechanism that is installed in an outward facing window of a building according to an embodiment of the present invention.

FIG. 6 shows a catching mechanism that is installed in an outward facing window of a building 600 according to an embodiment of the present invention. When the aircraft enters the airspace above the ground station 106, a catching surface 604 and a security lid 602 would extend outward from the building. In some embodiments, the lift mechanisms would be lid actuators 601 and catching surface actuators 606. The lifting mechanism and hinge attachment may be mounted to vertical oriented linear rails 605 which are connected to strong springs and shock absorbers comprising of the secondary shock absorption mechanisms.

In some embodiments the catching surface 604 may be mounted to the frame of the device using cables, pulleys, springs, and shock absorbers connected together to create the primary shock absorption 606. The catching receptacle 603 would be constructed of a semi-rigid durable material. In some embodiments, the homing beacon transmitting antenna may be installed into the connection seam of the catching surface 604 and catching receptacle 603. In some embodiments the transfer chute 208 may be constructed with a constricting cable mechanism wrapping perpendicular to the tube shape of the transfer chute. When the cable is pulled taught it would close the catching receptacle 603 from the storage location. After a successful drop, the constricting cable would be loosened to open the transfer chute 208, allowing the droppable package to be traverse through the chute to a storage location inside the building 600.

Figure 7:
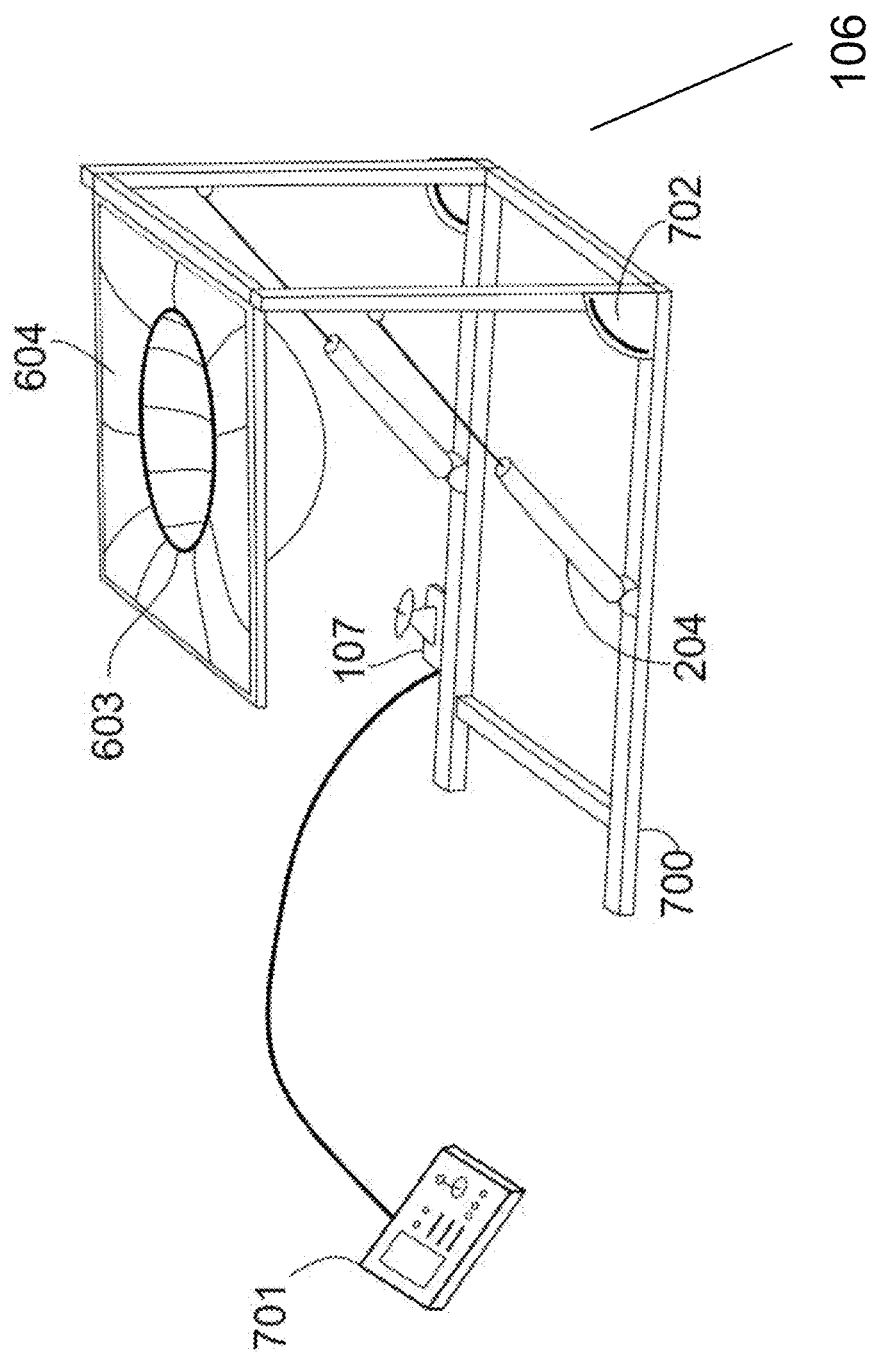
FIG. 7 illustrates a portable ground station that can be expanded and set up in the field according to an embodiment of the present invention.

FIG. 7 illustrates a portable ground station 106 that can be expanded and set up in the field according to an embodiment of the present invention. The ground station 106 would have a portable frame 700. In certain embodiments the ground station's frame 700 may be constructed into a framed or rigid backpack type carrying configuration. The catching mechanism may be unfolded and set up quickly in the field using hinge mechanisms 702. This would extend the catching surface 604 outward such that the catching receptacle 603 was facing upward. Detachable secondary shock absorption mechanisms 204 would aid in the support of the frame 700 for the catching mechanism.

In certain embodiments, the electronics and human interface console 701 can be mounted in a remote housing. This housing would be attached using a durable communications cable. In certain embodiments the LOS radio 107 equipment would be mounted directly to the frame of the device. This embodiment would be well suited for S/R parties, FF, and military in remote operation areas. With the portable system described above, the amount of equipment required to be carried in for an operation can be greatly reduced. Supplies can be flown in and dropped directly to the remote location of personnel. This will greatly increase the effectiveness and capabilities of such remote field operations and extend their durations.

Figure 8:
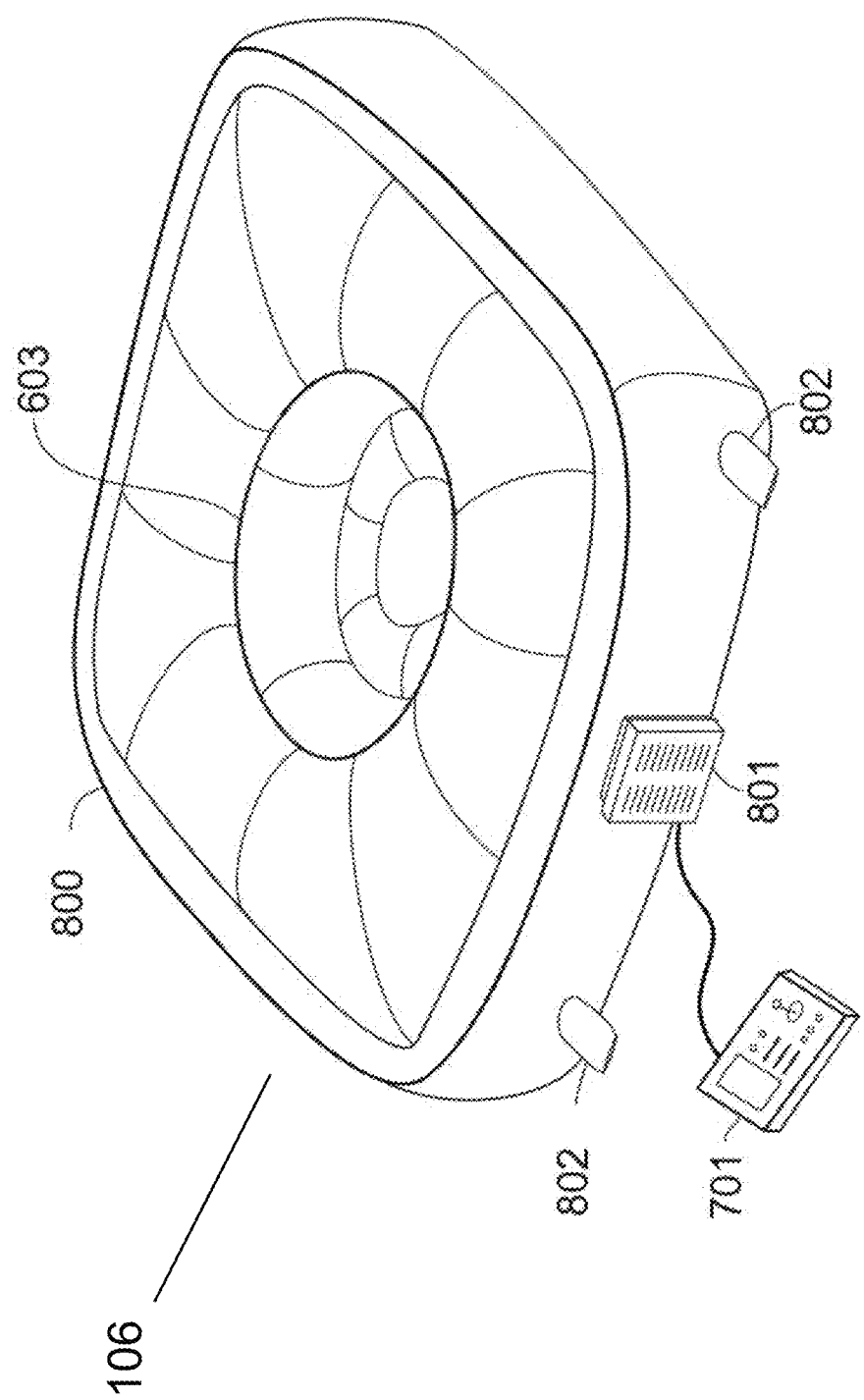
FIG. 8 shows a ground station that can self-inflate a portable air bag catching mechanism according to an embodiment of the present invention.

FIG. 8 shows a portable self-inflating ground station 106 having an air bag catching mechanism 800. This portable embodiment would be well suited for remote field operations due to light and compact portability. In certain embodiments the airbag catching mechanism 800 would become semi-rigid, but compressible, by air pressure from input fans 801. The catching receptacle 603 would take shape as the airbag catching mechanism 800 inflates. To release pressure quickly and prevent a bounced ejection from the catching mechanism, high volume outlet values 802 may be setup to release air as pressure spikes just above max stable pressure. The kinetic energy of the droppable package 104 is dissipated by air reduction in the airbag catching mechanism 800. In some embodiments the human interface 701 and ground electronics would be housed separately from the air bag catching mechanism, connected by a durable communications cable.

In certain embodiments airbag catching mechanism 800 would be pre-deployed in weather proof housings on rooftops of large buildings. In certain embodiments, airbag catching mechanism 800 could be deployed using current unmanned aircraft and parachute technologies to stranded persons. These embodiments would be well suited for disaster situations similar to the post Hurricane Katrina conditions in New Orleans.

Figure 9:
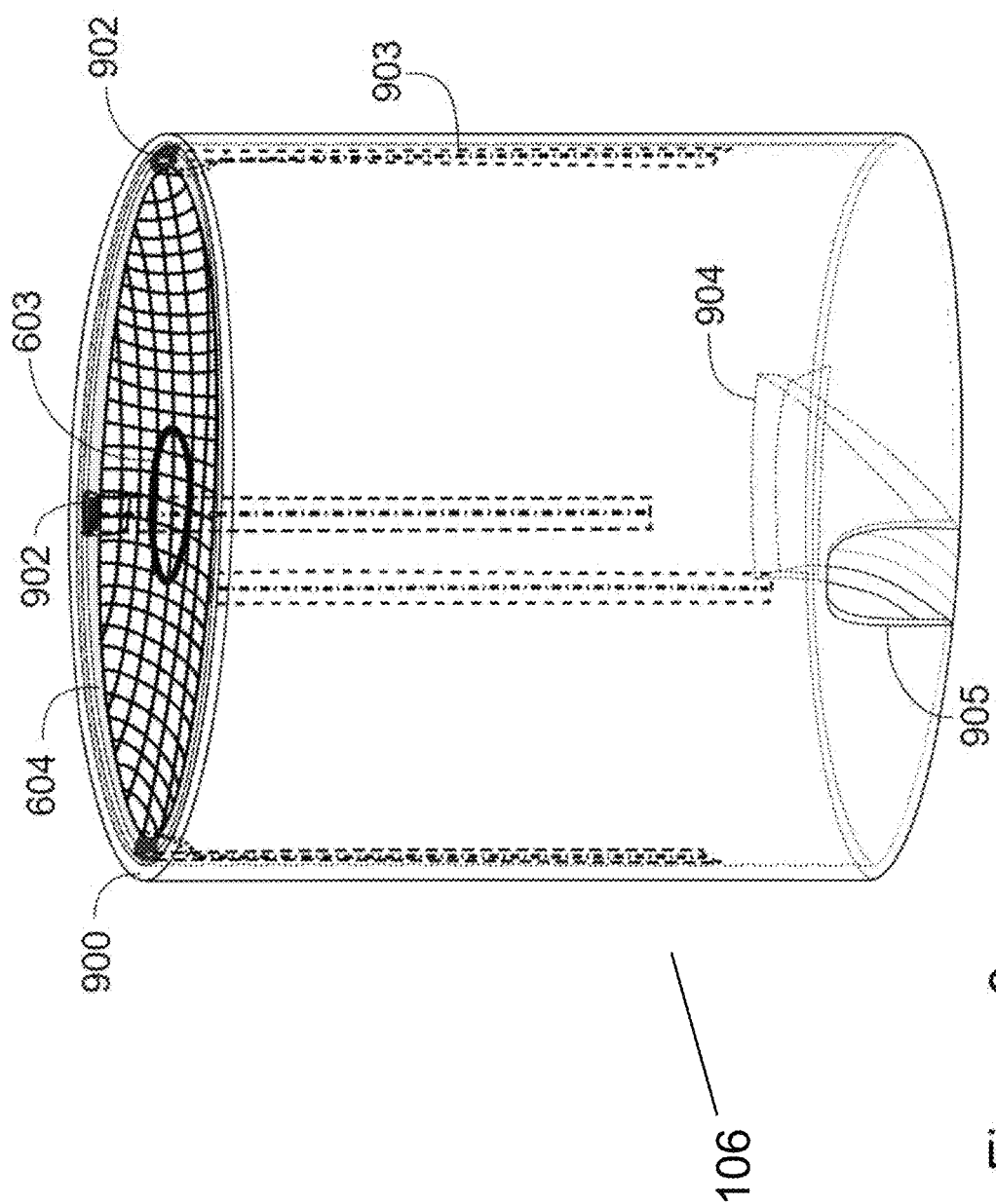
FIG. 9 shows a ground station using a constructed tower as the catching mechanism that will be permanently installed at a location according to an embodiment of the present invention.

FIG. 9 shows a ground station 106 using a constructed tower 900 as the catching mechanism that will be permanently installed at a location according to an embodiment of the present invention. The ground station tower 900, may be several feet tall and allow much larger payloads to be captured. The ground station tower 900 may absorb the impact force with very large shock absorbers 903 and linear rails built into the walls of the tower which then may lower the package to the ground. The catching surface 604 would be connected to the shock absorbers 903 on large linear bearing sleds 902. The catching receptacle 603 would be the source of the homing beacon and allow the large droppable package to pass through at the bottom of the tower. In some embodiments the bottom of the tower may have a guided ramp 904 to allow the large droppable package to slide to the edge of the tower. Once near ground level, the package will be slid out of the access port 905. The package may then be processed by separation and sorting of the contents therein at the location by people or placed into a sorting system. Scaling up the system may allow supply centers to transfer heavy droppable packages containing numerous smaller supplies between each other. Utilizing large fixed wing manned and unmanned aircraft, the system will be able to keep moving supplies between distribution centers to get them closer to the final destinations. This will decrease ship times from distance storage facilities, increasing delivery speed of the supply chain. In the preferred embodiment, the large droppable package 104 may be reusable.

Full System Embodiments

Figure 10:
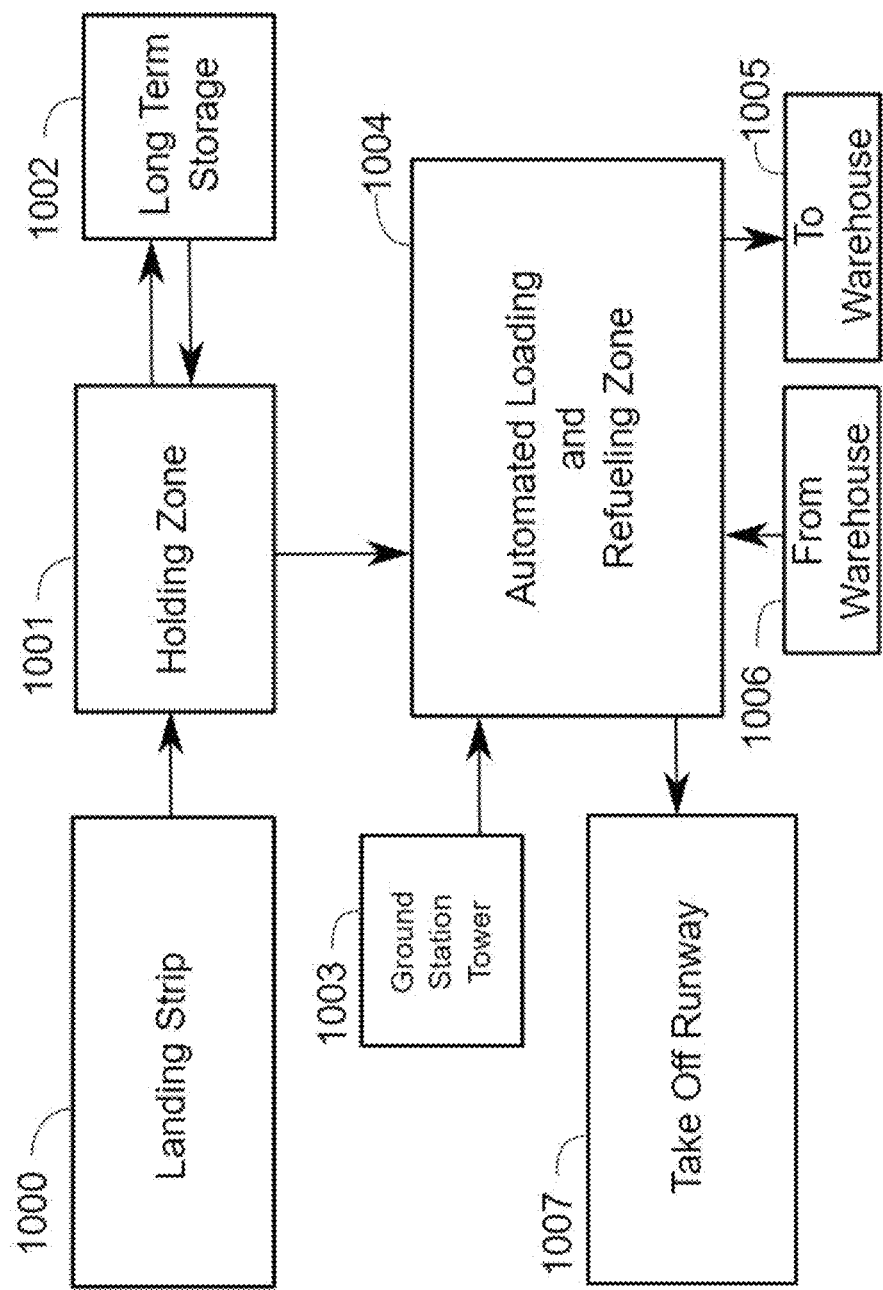
FIG. 10 illustrates a basic automated supply center concept diagram using the system for supply and delivery.

FIG. 10 illustrates a basic automated supply center concept diagram using the system for supply and delivery. Small "last mile" delivery aircraft will have a designated landing strip 1000 when returning to the center from a delivery. After they land, they will clear the landing strip 1000 and proceed to a holding zone 1001. This holding zone 1001 can separate necessary aircraft for use and send unneeded aircraft to long term holding and maintenance areas 1002. Aircraft that are designated to go out for delivery will be sent to the automated loading and refueling zone 1004. During this process the aircraft will be refueled or recharged, given destination information, then loaded with a droppable package from the warehouse 1006. After this the aircraft will proceed to the takeoff runway 1007. Once the airspace is clear, it will depart the supply center and begin traveling on the flight path created by the current designated flight route technology.

In addition to the smaller "last mile" aircraft, large ground station towers 1003 will be integrated to the into supply center. The ground station tower will connect to the automated loading and refueling zone to process the large droppable package. The towers will receive larger droppable packages sent from other supply centers across large geographic areas. In certain embodiments this center will be large enough for manned fixed wing cargo aircraft. In certain embodiments, large aircraft will be integrated into airports for refueling and loading of large droppable packages. Supplies ready to go out immediately will be separated and loaded into individual droppable packages. Supplies intended for longer term storage, or are not ready to proceed to final destination will be sent to a warehouse 1005 and stored until needed.

Standardization of the droppable package and the ground station will allow the system to integrate into multiple industries. This will stream line logistical models allowing for increased speeds of delivery using automated systems. In addition to automation reducing delays, it will reduce costs across the entire logistical chain.

Using the same ground station, and the same key features of the droppable packages, food delivery may be possible using the system. In some embodiments an automated distribution center may be built to operate with restaurants and groceries stores. Food products will be loaded into droppable packages and conveyed to the vehicles. Here the package will be loaded automatically onto a ready aircraft and immediately delivered.

In certain embodiments, the entire system will allow remote location supply operations to perform faster and safer than conventional systems. Larger operation camps or bases will be able to use the ground station towers to receive and store supplies. These supplies can then be delivered in smaller packages in the field.

With regard to the processes, systems, methods, heuristics, etc. described herein, it should be understood that, although the steps of such processes, etc. have been described as occurring according to a certain ordered sequence, such formed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein and that the disclosed systems and methods will be incorporated into such future embodiments. In summation, it should be understood that the application is capable of modification and variation.

What is claimed:

1. A method for using an aerial vehicle to deliver a reusable package, comprising:
   a. performing a path calculation to provide a predetermined parabolic fall trajectory for a reusable aerial package delivery vessel from a position of an aerial vehicle to hit a ground-based target;
   b. releasing the reusable aerial package delivery vessel on said parabolic fall trajectory path from said aerial vehicle;
   c. transmitting an electromagnetic signal from said ground-based target for the reusable aerial package delivery vessel, said signal providing at least a beacon signal from said ground-based target; and
   d. catching the reusable aerial package delivery vessel in a fall arresting mechanism at said ground-based target that is operable to dissipate and absorb the reusable aerial package delivery vessel's kinetic energy.

2. The method of claim 1, wherein said aerial vehicle and said ground-based target establish remote communication automatically.

3. The method of claim 2, wherein said remote communication is made via wireless transceivers using Reliable User Datagram Protocol.

4. The method of claim 3, wherein said wireless communication includes at least one of:
   a. exchanging authentication information,
   b. providing aerial vehicle with GPS location of said ground-based target,
   c. providing local weather information of said ground-based target to said aerial vehicle, and
   d. providing aerial vehicle with ideal approach vector information.

5. The method of claim 4, wherein said local weather information is gathered and stored, via a wind speed and direction sensor.

6. The method of claim 1, wherein said predetermined parabolic fall trajectory path calculation for the reusable aerial package delivery vessel is performed by an onboard computer operable to receive telecommunication signals on said aerial vehicle, and will determine the touchdown location of the reusable aerial package delivery vessel along the parabolic fall trajectory at the ground-based target.

7. The method of claim 1, wherein said reusable aerial package delivery vessel will receive at least one signal from said ground-based target allowing it to adjust its trajectory in flight if its path has deviated from the ground-based target.

8. The method of claim 1, wherein said reusable aerial package delivery vessel's kinetic energy is absorbed and dissipated by the fall arresting mechanism using a plurality of shock absorbing mechanisms.

9. The method of claim 1, wherein said fall arresting mechanism includes a chute through which said reusable aerial package delivery vessel may be passed to a storage location.

10. The method of claim 1, wherein said reusable aerial package delivery vessel has at least one flight control structure operable to adjust said parabolic flight trajectory path.

11. The method of claim 1, wherein said ground station houses a signal transmitter that provides at least one telecommunication signal to said reusable aerial package delivery vessel while said package is on said parabolic flight trajectory.

12. The method of claim 11, wherein said package includes a signal receiver operable to receive said at least one telecommunication signal and directionally sense the location of said signal transmitter.

* * * * *